United States Patent
Auerdahl

[15] 3,641,966
[45] Feb. 15, 1972

[54] POSITION INDICATOR

[72] Inventor: Olav Auerdahl, Sandvika, Norway
[73] Assignee: Norsk Hydro A.S., Bygdo Alle, Oslo, Norway
[22] Filed: May 21, 1970
[21] Appl. No.: 39,391

[30] Foreign Application Priority Data

May 22, 1969 Norway ..........................2099/69

[52] U.S. Cl..............................116/125, 73/412, 137/557, 116/70
[51] Int. Cl...................................................F16k 37/00
[58] Field of Search ...................116/70, 34, 125; 73/368.4, 73/368.6, 389, 393, 411–418; 137/553, 557

[56] References Cited

UNITED STATES PATENTS

| | | | |
|---|---|---|---|
| 2,350,533 | 6/1944 | Rose et al. | 73/389 X |
| 2,403,256 | 7/1946 | Beck | 73/412 |
| 3,095,745 | 7/1963 | Kirwan | 73/412 |

Primary Examiner—Louis J. Capozi
Attorney—Wenderoth, Lind & Ponack

[57] ABSTRACT

A position indicator system for remote indication of a position of a governing member. The indicator system has two bourdon tubes, the first of which is mechanically connected to the governing member and the second serves as an indicator actuator. The two bourdon tubes are interconnected with a capillary tubing in a closed hydraulic system and transmits the pressure variations generated by the mechanical subjection of the first bourdon tube by the governing member to the bourdon tube in the indicator. A compensating system has an additional pair of bourdon tubes, the first of which is installed at the location of the governing member, and the second of which is installed at the location of the indicator. The bourdon tubes are interconnected with a capillary tubing in a closed hydraulic system. A mechanical connection is provided between the pivotable fitting supporting the second bourdon tube and a free end of the bourdon tube at the indicator position.

4 Claims, 1 Drawing Figure

3,641,966
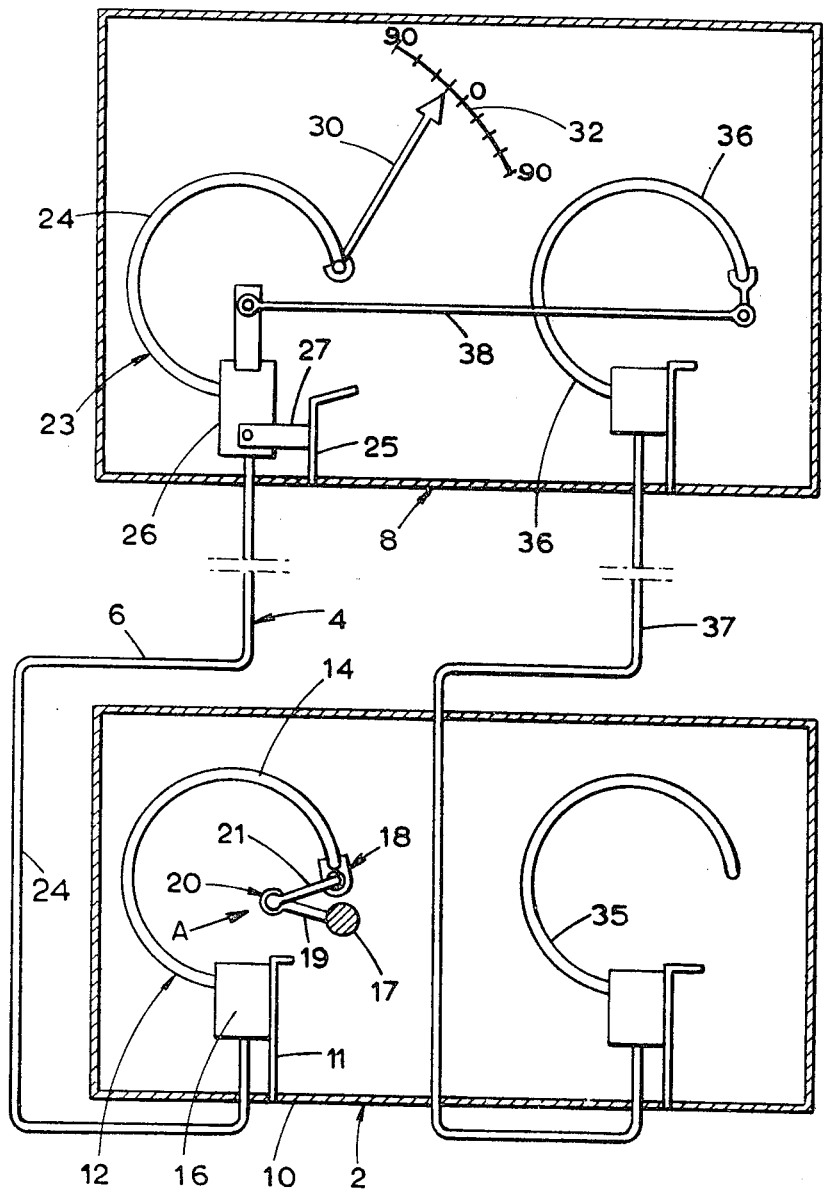
Olav Auerdahl,
INVENTOR

POSITION INDICATOR

The present invention relates generally to a position indicator, more particularly to an indicator for remote indication of the position of mechanical elements, for instance remote indication of the angular position of a butterfly valve.

There is known several kinds of mechanism which are able to meet this object. There is thus known position indicators which are actuated on basis of hydraulic, pneumatic, electrical or other means or a combination of such means.

The object of the present invention is to provide means in order to utilize the bourdon tube principle. A bourdon tube operates as known, on the principle that a normally noncircular or flattened closed tube-shaped member which is subjected to an internal pressure increase, will attempt to attain a circular cross-sectional shape, since the tubular space hereby will attain its largest volume. A bourdon tube is usually given the shape of a circular arch and the tube is flattened on both sides parallelly with the axis through said circular arch. When a tube is fixed at one end and the tube is subjected to an internal pressure increase, the tube will attempt to straighten out, and the degree or amount of the straightening will take place as a function of the internal pressure increase. When the pressure is decreased the tube will contract in the same fashion. The movement of the bourdon tube will in other words take place under elastic deformation in the tube material. There is known several types of pressure instruments where the bourdon tube principle is utilized to measure pressure variations or differentials.

The present invention is based upon the idea to utilize the bourdon tube principle in the opposite fashion namely to subject the bourdon tube to mechanical influence and deformation and thereby provide internal pressure variations which via pressure transmitting means is utilized to govern an indicator mechanism, preferably including a second bourdon tube. In other words, instead of transmitting pressure into movement one transmits movement into pressure, whereafter the pressure differential is utilized to provide a corresponding or identical movement in a second instrument positioned somewhere else.

In a practical embodiment of the invention the indicator system comprises preferably two identical bourdon tubes which are interconnected by means of a capillar tubing, and the entire system is closed and filled with a not compressible liquid. The member which position shall be remotely controlled, is arranged in mechanical connection with the one bourdon tube, whereby this as well as the other bourdon tube in the position indicator will move simultaneously and proportionally with the movements of the mechanical member influencing the one bourdon tube.

A position indicator system as above described can further in a per se known fashion be provided with a compensating system in order to compensate prevailing temperature and/or pressure changes, due to weather or climate conditions.

An embodiment for a position indicator in accordance with the invention shall be described with reference to the attached schematic accompanying DRAWING, wherein:

The reference number 2 generally designates the measuring or governing unit, 4 designates the transmitter in the shape of a capillar tubing 6, and 8 designates the indicator unit.

The governing unit 2 is influenced by a mechanical element, for instance a lever arm mounted on a butterfly valve spindle with the aim to be able to provide remote indication of the angular position of the spindle.

The governing unit 2 comprises a support, preferably shaped as a housing 10, wherein is mounted a first bourdon tube unit 12, comprising a bourdon tube 14 fixedly mounted on a fitting 16, mounted to a bracket 11 fixed to the housing 10. The governing member 20 is mechanically connected to the outer end 18 of the bourdon tube 14. As shown, the governing member constitutes part of a valve spindle 17 provided with a lever arm 19 which via a link 21 is linked to the outer end 18 of the bourdon tube.

From the bourdon tube member 16 to the indicator unit 8 is leading a capillar tubing 24. The indicator unit 8 comprises a bourdon tube 23, preferably identical with the bourdon tube unit in the governor 2. The combined support member and fitting 26 is turnable on a pivot arm 27 fixed to a bracket 25 in the indicator housing 28. To the outer end of the tubing is in known fashion arranged a pointer 30 running along a scale 32.

The above-described two bourdon tube units comprises further preferably an analogously designed compensator comprising a bourdon tube 36 in the indicator housing 8, and in the governor 2 a bourdon tube 35, and an intertransmitting capillar tubing 37. Between the outer end of the bourdon tube 36 and the turnable fitting 26 is coupled a link means 38.

The bourdon tubes with the capillar tubing constitute closed hydraulic systems and they are preferably filled with a not compressible liquid.

The indicator system in accordance with the invention operates as follows:

When the governing member 20 is being moved or turned by the lever arm 19 on the spindle 17, for instance in the direction of the arrow A in the FIGURE, the bourdon tube 12 will be pressed outwards, i.e., the diameter will increase, resulting in that the pressure in the tube will be reduced and this pressure reduction will via the capillar tubing immediately be transmitted to the bourdon tube 24 in the indicator unit having in result that the pointer 30 on the scale 32 will indicate the movement of the governing member 20. If the governing member is moving in the opposite direction such that the bourdon tube 12 will be contracted, the result will be a corresponding pressure increase in the tube which will result in that the pointer will move the other way along the scale 32. In other words any angular movement of the spindle 17 will be accurately indicated on the scale 32.

The mechanical connection between the governing member 20 and the bourdon tube 12 is preferably arranged as a link mechanism, as shown. Alternatively one can, however, utilize the flexible properties of the bourdon tube and position the governing member directly biased against the outer part of the bourdon tube, whereby the transmittance of movements will take place during a sliding movement therebetween.

In order to avoid erroneous indications in consequence of pressure and/or temperature variations in the environments one should arrange a parallelly operating compensating system. A compensating system utilizing bourdon tubes is as such known, but it is shown in the FIGURE in order to illustrate the preferred realization of the invention. When the temperature in the environments for instance increases, the pressure in the bourdon tubes will increase correspondingly, but the pivotable bourdon tube unit 23 in the position indicator will be imparted a rotary motion in opposite direction compared with the rotary motion which the bourdon tube 12 is transmitting to this tube, whereby the resulting movement of the pointer 30 will be equal to zero, i.e., complete compensator.

Several embodiments of the invention can be conceived within the scope of the inventive concept. The invention is thus not limited to the specific structure herein shown and described, but may be embodied in other forms without departure from its spirit.

What is claimed is:

1. A position indicator device for remote indication of the position of a governing member, such as the position of a valve, said indicator device comprising an indicator having pointer means, a first and a second bourdon tube, said first tube being located at a measuring point and connected to said governing member, said second tube being located at an indicating point and connected to said indicator, a capillar tubing interconnecting said bourdon tubes in a closed fluid system transmitting pressure variations, means connecting said first tube mechanically to said governing member to subject said first tube to mechanical subjection generating corresponding internal pressure variations which said capillary tubing transmits to said second tube connected to said indicator.

2. A position indicator device in accordance with claim 1 wherein a housing is provided for said indicator, a pivotable armature supported in said housing has said pointer means fixed thereto, and said capillar tubing is connected to said pivotable armature.

3. A position indicator device in accordance with claim 1 wherein said governing member is mechanically connected to one end of said first tube and the other end is fixed.

4. A position indicator device in accordance with claim 1, wherein said device includes a compensating system comprising an additional pair of bourdon tubes, the first of which is installed at the location of said governing member, and the second of which is installed at the location of said indicator, said bourdon tubes being interconnected with a capillar tubing in a closed hydraulic system, a mechanical connection being provided between a pivotable fitting supporting the second bourdon tube and a free end of the bourdon tube at the indicator position.

* * * * *